US010727541B2

(12) United States Patent
Oh et al.

(10) Patent No.: US 10,727,541 B2
(45) Date of Patent: Jul. 28, 2020

(54) SECONDARY BATTERY COMPRISING GAS-ABSORBING POLYMER

(71) Applicant: LG Chem, Ltd., Seoul (KR)

(72) Inventors: Sei Woon Oh, Daejeon (KR); Hyun Min Kim, Daejeon (KR); Sun Hwak Woo, Daejeon (KR)

(73) Assignee: LG Chem, Ltd. (KR)

(*) Notice: Subject to any disclaimer, the term of this patent is extended or adjusted under 35 U.S.C. 154(b) by 43 days.

(21) Appl. No.: 15/770,963

(22) PCT Filed: Jan. 6, 2017

(86) PCT No.: PCT/KR2017/000173
§ 371 (c)(1),
(2) Date: Apr. 25, 2018

(87) PCT Pub. No.: WO2017/119750
PCT Pub. Date: Jul. 13, 2017

(65) Prior Publication Data
US 2019/0252737 A1    Aug. 15, 2019

(30) Foreign Application Priority Data
Jan. 6, 2016    (KR) .......................... 10-2016-0001582

(51) Int. Cl.
*H01M 10/42*    (2006.01)
*H01M 10/0567*    (2010.01)
(Continued)

(52) U.S. Cl.
CPC ......... *H01M 10/4235* (2013.01); *B01J 20/26* (2013.01); *H01M 2/0217* (2013.01);
(Continued)

(58) Field of Classification Search
CPC .... H01M 10/42; H01M 10/0525; H01M 2/02; H01M 2/10; H01M 4/62
See application file for complete search history.

(56) References Cited

U.S. PATENT DOCUMENTS 1,678,405 A * 7/1928 Oppenheim .......... H01M 12/06
427/115
7,776,465 B1    8/2010 Hatazawa et al.
(Continued)

FOREIGN PATENT DOCUMENTS

EP    1120850 A1    8/2001
JP    2000077103 A    3/2000
(Continued)

OTHER PUBLICATIONS

Arab, et al., "Copper(I)-Catalyzed Synthesis of Nanoporous Azo-Linked Polymers: Impact of Textural Properties on Gas Storage and Selective Carbon Dioxide Capture", Chemistry of Materials, vol. 26, p. 1385-1392, Jan. 10, 2014.*
(Continued)

*Primary Examiner* — Kenneth J Douyette
(74) *Attorney, Agent, or Firm* — Lerner, David, Littenberg, Krumholz & Mentlik, LLP

(57) ABSTRACT

The present invention provides a secondary battery in which an electrode assembly is sealed within a battery case together with an electrolyte, wherein a gas-absorbing polymer having an azo group is included in the battery cell so as to absorb gas generated within the battery.

10 Claims, 4 Drawing Sheets

(51) Int. Cl.
    *H01M 2/02*     (2006.01)
    *H01M 2/10*     (2006.01)
    *B01J 20/26*     (2006.01)
    *H01M 10/0585*     (2010.01)
    *H01M 10/052*     (2010.01)
    *H01M 4/62*     (2006.01)
    *H01M 10/0525*     (2010.01)

(52) U.S. Cl.
    CPC ....... *H01M 2/0275* (2013.01); *H01M 2/0277* (2013.01); *H01M 2/0285* (2013.01); *H01M 2/0287* (2013.01); *H01M 2/0295* (2013.01); *H01M 2/1094* (2013.01); *H01M 4/621* (2013.01); *H01M 10/052* (2013.01); *H01M 10/0525* (2013.01); *H01M 10/0567* (2013.01); *H01M 10/0585* (2013.01); *H01M 2002/0297* (2013.01); *H01M 2200/00* (2013.01); *Y02T 10/7011* (2013.01)

(56) References Cited

U.S. PATENT DOCUMENTS

| | | | |
|---|---|---|---|
| 2002/0183431 A1* | 12/2002 | Kawaguchi | C08K 3/00 524/394 |
| 2003/0049519 A1 | 3/2003 | Ishida et al. | |
| 2004/0185330 A1 | 9/2004 | Yamaguchi et al. | |
| 2012/0088129 A1 | 4/2012 | Kaneda et al. | |

FOREIGN PATENT DOCUMENTS

| | | | |
|---|---|---|---|
| JP | 2001155790 A | 6/2001 | |
| JP | 2003036850 A | 2/2003 | |
| JP | 2004227818 A | 8/2004 | |
| JP | 2011249269 A | 12/2011 | |
| JP | 2012204131 A | 10/2012 | |
| KR | 20010047187 A | 6/2001 | |
| KR | 20080036257 A | 4/2008 | |
| KR | 20120042752 A | 5/2012 | |
| KR | 20140089706 A | 7/2014 | |
| KR | 20150091898 A | 8/2015 | |
| KR | 20150108040 A | 9/2015 | |
| KR | 20150126129 A | 11/2015 | |
| WO | 2015119307 A1 | 8/2015 | |

OTHER PUBLICATIONS

Extended European Search Report including Written Opinion for Application No. EP17736122.7 dated Aug. 6, 2018.

Abraham, "Highly porous organic polymer shows promise as CO2 trap", Phys Org, Feb. 12, 2014.

International Search Report for Application No. PCT/KR2017/000173 dated Apr. 10, 2017.

Patel et al., "Unprecedented high-temperature CO2 selectivity in N2-phobic nanoporous covalent organic polymers", Nature Communications, Jan. 15, 2013, pp. 1-8.

\* cited by examiner

SECONDARY BATTERY COMPRISING GAS-ABSORBING POLYMER

CROSS-REFERENCE TO RELATED APPLICATIONS

This application is a national phase entry under 35 U.S.C. § 371 of International Application No. PCT/KR2017/000173 filed on Jan. 6, 2017, published in Korean, which claims priority from Korean Patent Application No. 10-2016-0001582 filed on Jan. 6, 2016, the entire contents of which are incorporated herein by reference.

TECHNICAL FIELD

The present invention relates to a secondary battery including a gas-absorbing polymer.

BACKGROUND

As technology development and demand for mobile devices have increased, there has been a rapid increase in demand for batteries as energy sources, and thus a lot of research has been conducted on batteries capable of satisfying various demands.

Representatively, there is high demand for a prismatic secondary battery and a pouch-type secondary battery which have a small thickness to be applicable to products such as mobile phones in terms of a battery shape, and there is high demand for a lithium secondary battery such as a lithium ion battery and a lithium ion polymer battery with high energy density, a high discharge voltage, and output stability in terms of a material.

However, the lithium secondary battery has a drawback in terms of safety, despite all these merits. Specifically, when the lithium secondary battery reaches an abnormal operation state such as an internal short circuit, an overcharge, exposure to a high temperature, and the like after being finally sealed, a high pressure gas may be generated when an electrolyte therein is decomposed. Herein, the generated high pressure gas may cause deformation of a battery case and shorten a cycle-life of the battery, and more seriously, may cause ignition or explosion of the battery.

Conventionally, in order to improve safety of a lithium secondary battery, a method of using a PTC (positive temperature coefficient), a fuse, a protective circuit under a reduced pressure, or the like, a method of including an additive for improving safety of an electrolyte or an electrode, or the like has been used, but the lithium secondary battery still has a problem of gas generation due to an abnormal reaction inside the battery under an abnormal condition or performance deterioration due to inclusion of the additive, even though the battery is provided with this equipment.

In addition, as a conventional part functioning as a gas pocket tends to gradually disappear along with a recent increase and requirement of higher energy density, a new method for preventing ignition or explosion of a battery during gas generation therein and efficiently removing gas without deteriorating overall performance of the battery is required.

Technical Problem

An object of the present invention is to solve the problem of the conventional art and technical objects from the past.

Technical Solution

By repeating in-depth studies and various experiments, the inventors of this application confirmed that when a battery cell is manufactured using a battery case including a gas-absorbing polymer having an azo group which will be described below, absorption properties for a gas generated within the battery cell are improved due to a hollow structure and chemical properties of the gas-absorbing polymer, and thus explosion and ignition caused by a gas increase within the battery cell may be suppressed and battery safety is improved, and completed the present invention.

In order to achieve such a purpose, a secondary battery according to the present invention includes an electrode assembly together with an electrolyte sealed within a battery case, and the gas-absorbing polymer having the azo group is included in a battery cell to absorb and remove gas generated within the battery.

In this way, the secondary battery according to the present invention includes a gas-absorbing polymer capable of absorbing a gas such as carbon dioxide generated within the battery cell, and may reduce swelling caused by gas generation within a conventional battery cell and thus battery explosion and ignition, remarkably improving battery safety.

In addition, a conventional oxide or hydroxide gas-absorbing material undergoes a side-reaction with an electrolyte, but a gas-absorbing polymer having an azo group has no reactivity with a separator or an electrode, and thus not only may the side-reaction with an electrolyte be prevented, but there may be no performance deterioration.

In one specific embodiment, the battery case may be a pouch-type case of a laminate sheet including a gas-absorbing polymer layer, or may be a prismatic can or a cylindrical battery case.

The laminate sheet includes an external coating layer, a barrier metal layer, and a heat-fusion resin layer, and the heat-fusion resin layer is coated with a gas-absorbing polymer layer including a gas-absorbing polymer. Specifically, the laminate sheet used in the secondary battery includes a gas-absorbing polymer layer as well as a heat-fusion resin layer for sealing the battery case in a conventional laminate sheet.

In such a structure, the gas-absorbing polymer layer may include a matrix binder in addition to the gas-absorbing polymer.

The matrix binder may be a polymer that is present in a polymer matrix to form the gas-absorbing polymer layer, and while a material of the matrix binder is not particularly limited, it may be, for example, at least one selected from epoxy-based, phenol-based, melamine-based, polyester-based, urethane-based, polyethylene terephthalate-based, and polyether urethane-based resins.

The gas-absorbing polymer layer may be coated on all parts of the battery case, and preferably on at least one part of internal surfaces of a container contacting an electrolyte, excluding a sealing part of the battery case. When a laminate sheet having no gas-absorbing polymer layer is used at the sealing part, the gas-absorbing polymer layer is formed except at the sealing part of the battery case, and thus may prevent deterioration of a sealing force and deterioration of absorption capability of gas generated inside the battery.

A coating thickness of the gas-absorbing polymer layer may be, for example, within a range of 0.1 μm to 100 μm, and in detail, 0.5 μm to 70 μm.

When the coating thickness of the gas-absorbing polymer layer is smaller than 0.1 μm, the gas-absorbing polymer layer is included in a smaller amount and thus has a drawback of absorbing a smaller amount of gas, but when the coating thickness of the gas-absorbing polymer layer is larger than 100 μm, it may increase an overall thickness of the laminate sheet and thus fails to provide a compact battery cell.

In another specific embodiment, the gas-absorbing polymer may be included in the electrolyte. When the electrolyte includes a gas-absorbing polymer, gas generated due to decomposition of an electrolyte under an abnormal situation may be immediately absorbed.

In this case, an amount of the gas-absorbing polymer may be within a range of 0.05% to 10%, and in detail, 0.1% to 5%, based on a weight of the electrolyte.

When the gas-absorbing polymer is included in a smaller amount than 0.05%, an amount of the gas-absorbing polymer is decreased, and thus an absorption amount of gas may be decreased, but when the gas-absorbing polymer is included in a larger amount than 10%, ion conductivity decreases as viscosity of an electrolyte increases, and thus battery performance may be deteriorated.

In one specific embodiment, the gas-absorbing polymer may be azo-linked porous organic polymers (ALPs), which may be, for example, prepared by polymerizing at least one monomer selected from the group consisting of 1,3,5,7-tetrakis(4-aminophenyl) adamantine (TAPA), 2,6,12-triaminotriptycene (TAT), tetrakis(4-aminophenyl) methane (TAM), and 1,3,5-tris(4-aminophenyl) benzene (TAB).

Specifically, the gas-absorbing polymer may be polymerized by CuBr and pyridine working as a catalyst and coupling the same kind of monomers including an aniline group. Herein, an azo group coupling the monomers to one another and showing gas absorption properties is formed from an amino group of the monomers.

The polymerization reaction may use toluene, THF, or chloroform as a solvent. However, when a single solvent is used, there may be a problem of a decrease in solubility of the monomers in the solvent, deterioration of a polymerization reaction and a CuBr-pyridine catalyst reaction, or a surface area decrease of the gas-absorbing polymer. Accordingly, in order to prepare the gas-absorbing polymer having a maximum surface area, the polymerization reaction may proceed in a mixed solvent of toluene and THF.

The ALPs may have various shapes such as a spherical shape, a fiber shape, and a ribbon shape, and in addition, may have various particle sizes within a range of 1 nm to 800 nm, and specifically in a range of 200 nm to 700 nm, without having a particular limit regarding a particle diameter as long as they have a nanometer size. When the particle diameter is less than 1 nm, the gas-absorbing polymer may have too small a pore size and thus not properly absorb a gas, but when the particle diameter is greater than 800 nm, the gas-absorbing polymer may have a decreased surface area and thus absorb a smaller amount of gas.

In addition, the ALPs may have a specific surface area ranging from 850 $m^2/g$ to 1250 $m^2/g$, specifically 900 $m^2/g$ to 1200 $m^2/g$, and more specifically 950 $m^2/g$ to 1150 $m^2/g$. Since the above-sized specific surface area is twice to three times as large as that of a conventional porous polymer covalently bonded with an azo group, the ALPs may interact in a larger area with a gas and thus show a much higher gas absorption rate.

This gas-absorbing polymer may selectively absorb carbon dioxide and carbon monoxide among gasses generated inside a battery cell. In other words, the gas-absorbing polymer may absorb carbon dioxide and carbon monoxide that are highly generated during use of a battery cell, and thus more easily prevent a swelling phenomenon than when it absorbs one kind of gas.

Furthermore, the gas-absorbing polymer shows excellent absorption regarding carbon dioxide, and thus may selectively absorb carbon dioxide alone and remove carbon dioxide that has a side-reaction with an electrolyte and resultantly prevent a vicious circle of the side-reaction of an electrolyte and gas generation.

The carbon dioxide and carbon monoxide may be absorbed in an amount of 10% to 30% of a weight of the gas-absorbing polymer. Specifically, 1 g of the gas-absorbing polymer may absorb at least 236 mg of carbon dioxide and carbon monoxide at room temperature.

This high carbon dioxide and carbon monoxide absorption force of the gas-absorbing polymer is shown due to an interaction between an azo group of the gas-absorbing polymer and molecules of carbon dioxide and carbon monoxide. Specifically, since nitrogen atoms of the azo group working as a Lewis base and carbon atoms of carbon dioxide and carbon monoxide working as Lewis acid form a strong bond, a large amount of carbon dioxide and carbon monoxide may be removed in a battery cell.

The present invention also provides a battery pack including the lithium secondary battery as a unit battery, and a device including the battery pack as a power source.

Specifically, the battery pack may be used as a power source of a device requiring high temperature safety, long cycle characteristics, high rate characteristics, and the like, and specific examples of the device may include a mobile electronic device, a power tool obtaining power by a battery-based motor, an electric car including an electric vehicle (EV), a hybrid electric vehicle (HEV), a plug-in hybrid electric vehicle (PHEV), and the like, an electric two-wheeler including an E-bike and an E-scooter, an electric golf cart, an electricity storage system, and the like, but are not limited thereto.

A structure and a manufacturing method of these devices are well known in the related art and thus are not illustrated in detail in the present specification.

DETAILED DESCRIPTION OF THE EMBODIMENTS

Hereinafter, the present invention will be described with reference to the drawings according to examples of the present invention, which are provided for better understanding of the present invention, and thus the scope of the present invention is not limited thereto.

Figure 1B:
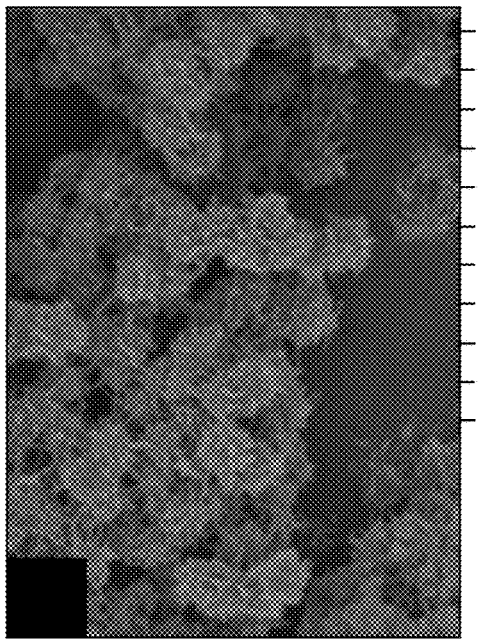
FIGS. 1A-1D are electron microscope (SEM) photographs of the gas-absorbing polymers according to Examples 1 to 4, respectively.
Figure 1D:
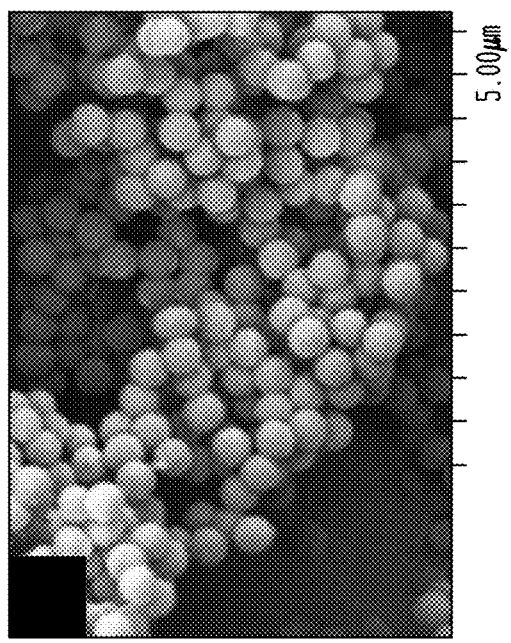
Figure 1A:
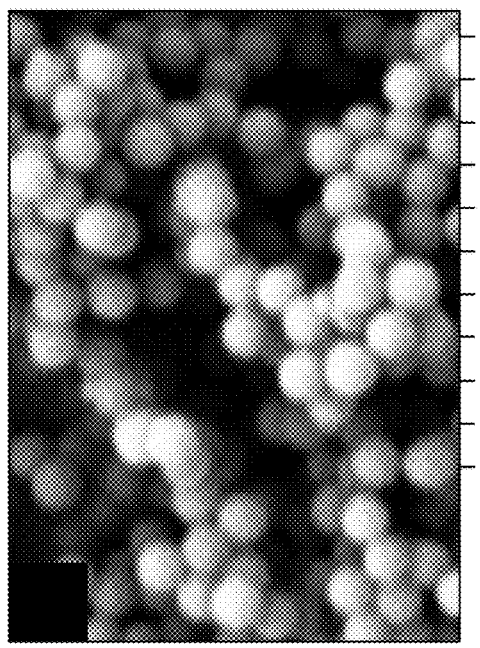
Figure 1C:
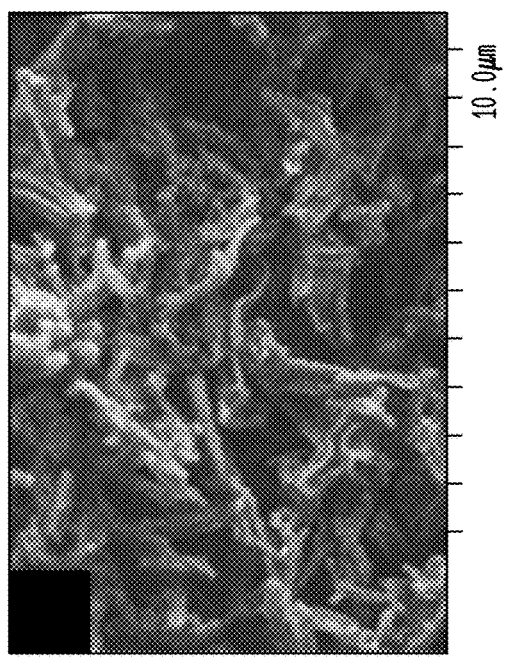
Figure 2:
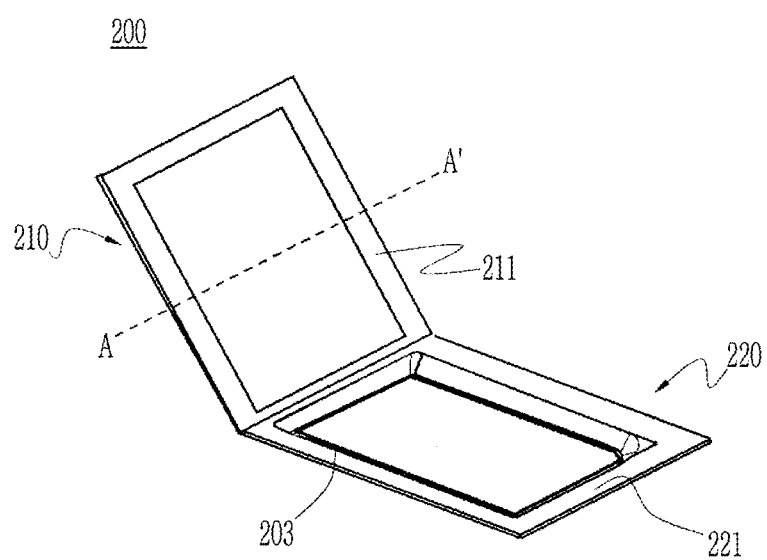
FIG. 2 is a perspective view showing a pouch-type secondary battery cell having a gas-absorbing polymer layer according to one embodiment of the present invention.

FIG. 2 is a perspective view schematically showing a pouch-type secondary battery having a gas-absorbing polymer layer according to one embodiment of the present invention.

Referring to FIG. 2, a pouch-type secondary battery 200 is composed of a lower case 220 including an electrode assembly container 203 and an upper case 210 sealed with the lower case 220 on the container 203, and the upper case 210 and the lower case 220 are connected with each other at a part of external circumferential surfaces 211 and 221. The upper case 210 and the lower case 220 are sealed through heat-fusion, and form a sealing part on the external circumferential surfaces 211 and 221 of the lower case 220.

Figure 3:
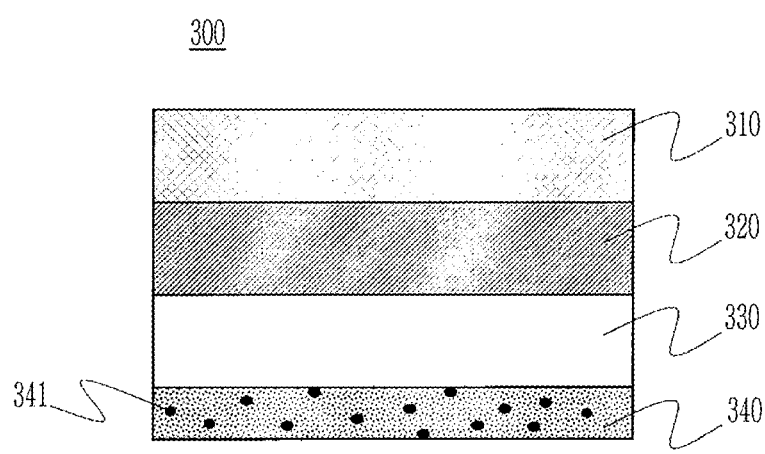
FIG. 3 is a view showing a cross-section of the pouch-type secondary battery cell of FIG. 2 which is taken along line A-A'.

FIG. 3 schematically shows a partial cross-section of the battery case of FIG. 2, which is taken along line A-A'.

Referring to FIG. 3, a laminate sheet 300 has a structure in which an external coating layer 310, a barrier metal layer 320, a heat-fusion resin layer 330, and a gas-absorbing polymer layer 340 including a gas-absorbing polymer 341 are sequentially formed in order from the outside. The heat-fusion resin layer 330 is disposed over the entire internal surface of the barrier metal layer 320, and the gas-absorbing polymer layer 340 is disposed over the entire internal surface of the heat-fusion resin layer 330.

Figure 4:
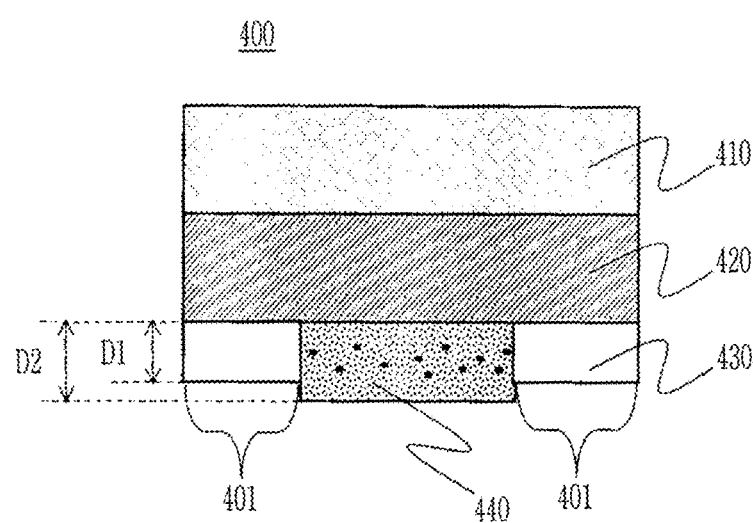
FIG. 4 is a vertical cross-sectional view showing a laminate sheet having a gas-absorbing polymer layer according to another exemplary embodiment of the present invention.

FIG. 4 shows a vertical cross-section of a laminate sheet having a gas-absorbing polymer layer according to another embodiment of the present invention.

Referring to FIG. 4, a laminate sheet 400 has a structure in which an external coating layer 410 and a barrier metal layer 420 are sequentially formed, a heat-fusion resin layer 430 forms a sealing part 401 at a part of the barrier metal layer 420, and a gas-absorbing polymer layer 440 is formed at a part other than the part where the heat-fusion resin layer 430 is formed.

In this way, the gas-absorbing polymer layer 440 is formed at the other part of the heat-fusion resin layer 430 except for a part corresponding to the sealing part 401, and thus may prevent deterioration of a sealing force without deteriorating an absorption force of gas generated inside the battery cell.

Further, the gas-absorbing polymer layer 440 may have the same thickness D2 as a thickness D1 of the heat-fusion resin layer 430, but in order to increase the gas absorption force, the thickness D2 of the gas-absorbing polymer layer 440 may be formed to be thicker than the thickness D1 of the heat-fusion resin layer 430.

Hereinafter, exemplary embodiments of the present invention are described.

Example 1

0.334 mmol (100 mg) of 2,6,12-triaminotriptycene (TAT) as a monomer and 0.164 mmol (23.5 mg) of CuBr and 1.19 mmol (94 mg) of pyridine as a catalyst were added to 22 mL of a THF/toluene solvent, and the mixture was firstly stirred at room temperature for 24 hours, secondly stirred at 60° C. for 12 hours, and thirdly stirred at 80° C. for 12 hours. Subsequently, the mixed solution was filtered, washed with THF, and washed with water. Remaining powders were immersed in hydrogen chloride (HCl) for 24 hours, filtered again, and respectively washed with water, sodium hydroxide (NaOH), and an ethanol aqueous solution in that order. The obtained powders were dried at 110° C. at 150 mTorr to prepare 70 mg of a reddish brown powder ALP-1.

Example 2

84 mg of a reddish brown powder ALP-2 was prepared according to the same method as Example 1, except for using 0.26 mmol (100 mg) of tetrakis(4-aminophenyl)methane (TAM) instead of the 2,6,12-triaminotriptycene (TAT) as a monomer, 0.174 mmol (25 mg) of CuBr, and 1.35 mmol (107 mg) of pyridine.

Example 3

74 g of a reddish brown powder ALP-3 was prepared according to the same method as Example 1, except for using 0.2 mmol (100 mg) of 1,3,5,7-tetrakis(4-aminophenyl)adamantine (TAPA) instead of the 2,6,12-triaminotriptycene (TAT) as a monomer, 0.132 mol (19 mg) of CuBr, and 1.02 mmol (81 mg) of pyridine.

Example 4

74 g of a reddish brown powder ALP-4 was prepared according to the same method as Example 1, except for using 0.28 mmol (100 mg) of 1,3,5-tris(4-aminophenyl)benzene (TAB) instead of the 2,6,12-triaminotriptycene (TAT) as a monomer, 0.139 mmol (20 mg) of CuBr, and 1.01 mmol (80 mg) of pyridine.

Experimental Example 1

ALP-1 to ALP-4 according to Examples 1 to 4 were photographed with a SEM, and the results are shown in FIGS. 1A-1D. Referring to FIGS. 1A-1D, Example 1 (FIG. 1 A) and Example 4 (FIG. 1 D) exhibited a spherically-shaped particle, Example 2 (FIG. 1 B) exhibited a fiber-type particle, and Example 3 (FIG. 1 C) exhibited a ribbon-type particle.

Experimental Example 2

In order to measure an absorption amount of ALP-1 to ALP-4 according to Examples 1 to 4, ALP-1 to ALP-4 according to Examples 1 to 4 were exposed to carbon dioxide gas and methane gas at 1 atm at 0° C. and at 1 atm at 25° C., and the results are shown in Table 1.

TABLE 1

|  | $CO_2$ absorption amount (mg/g) | | Methane absorption amount (mg/g) | |
|---|---|---|---|---|
| Temperature | 0° C. | 25° C. | 0° C. | 25° C. |
| Example 1 | 236 | 143 | 26.0 | 15.0 |
| Example 2 | 211 | 108 | 17.6 | 10.7 |
| Example 3 | 166 | 101 | 17.2 | 9.6 |
| Example 4 | 155 | 81 | 14.3 | 8.3 |

As shown in Table 1, a gas-absorbing polymer having an azo group absorbed carbon dioxide gas at at least greater than or equal to 9 times as much as methane gas, and accordingly, a large amount of carbon dioxide in gas generated inside a secondary battery cell including the gas-absorbing polymer was selectively removed.

Example 5

An electrolyte was prepared by dissolving $LiPF_6$ at a concentration of 1 M in a mixed solvent (EC (ethyl carbonate):PC (propylene carbonate):DEC (diethyl carbonate) of 3:2:5 (volume ratio), and the ALP-1 polymer according to Example 1 was used to form a 10 μm-thick gas-absorbing polymer layer on a part of an external surface of a barrier metal layer to obtain a laminate sheet. Subsequently, the laminate sheet was used to fabricate a battery case, and then an electrode assembly consisting of a negative electrode formed of natural graphite, a positive electrode formed of $LiCoO_2$, and the electrolyte were housed in the battery case to fabricate a pouch-type secondary battery cell.

Example 6

A pouch-type secondary battery cell including ALP-2 was fabricated according to the same method as Example 1, except for forming a gas-absorbing polymer layer on a part of an external surface of a barrier metal layer on a laminate sheet by using the ALP-2.

Example 7

A pouch-type secondary battery cell including ALP-3 was fabricated according to the same method as Example 1, except for forming a gas-absorbing polymer layer on a part of an external surface of a barrier metal layer on a laminate sheet by using the ALP-3.

Example 8

A pouch-type secondary battery cell including ALP-4 was fabricated according to the same method as Example 1, except for forming a gas-absorbing polymer layer on a part of an external surface of a barrier metal layer on a laminate sheet by using the ALP-4.

Example 9

An electrolyte and an electrode assembly according to Example 5 were prepared, and then a prismatic secondary battery cell including 5% of ALP-1 relative to a weight of the electrolyte was fabricated by injecting the ALP-1 according to Example 1 into the electrolyte.

Comparative Example 1

A secondary battery cell was fabricated according to the same method as Example 5, except for using a laminate sheet including no gas-absorbing polymer having an azo group.

Experimental Example 3

In order to measure a gas generation amount of a secondary battery cell, the secondary battery cell according to Comparative Example 1 was stored in a 60° C. box for 8 weeks, and the gas generation amount of the secondary battery cell was measured, and the results are shown in Table 2.

TABLE 2

|  |  | Stored time | | | |
|---|---|---|---|---|---|
|  |  | 2 weeks | 4 weeks | 8 weeks | Total |
| Total gas amount (mL) | | 101.1 | 82.3 | 69.2 | 252.6 |
| Gas amount (mL) | $N_2$ | <0.01 | 1.56 | 1.0 | <1.67 |
|  | $O_2$ | <0.01 | 0.19 | <0.1 | <0.3 |
|  | $C_3H_8$ | 0.10 | 0.11 | <0.1 | <0.31 |
|  | $C_3H_6$ | 0.10 | 0.09 | <0.1 | <0.29 |
|  | $C_2H_6$ | 2.53 | 2.58 | 2.6 | 7.71 |
|  | $C_2H_4$ | 0.74 | 0.57 | 0.2 | 1.51 |
|  | $C_2H_2$ | 0.06 | 0.07 | <0.1 | <0.23 |
|  | $CH_4$ | 11.28 | 11.79 | 13 | 36.07 |
|  | $CO_2$ | 58.62 | 38.79 | 29 | 126.41 |

TABLE 2-continued

|  | Stored time | | | |
|---|---|---|---|---|
|  | 2 weeks | 4 weeks | 8 weeks | Total |
| CO | 26.97 | 25.95 | 23 | 75.92 |
| $H_2$ | 0.65 | 0.64 | 0.4 | 1.69 |

As shown in Table 2, a total gas generation amount after 8 weeks was 252.64 ml, wherein an amount of carbon dioxide was 126.41 ml, an amount of carbon monoxide was 75.92 ml, and a total amount of other gases was about 50.31 ml.

Experimental Example 4

In order to measure a volume change due to swelling, the secondary battery cells according to Examples 5 to 9 and Comparative Example 1 were stored in a 60° C. box for 8 weeks, then initial volumes and volumes after 8 weeks were measured, and a volume increase amount was calculated by subtracting the initial volume from the changed volume, and the results are shown in Table 3.

TABLE 3

|  | Volume Increase Amount (ml) |
|---|---|
| Example 5 | 52 |
| Example 6 | 55 |
| Example 7 | 62 |
| Example 8 | 58 |
| Example 9 | 53 |
| Comparative Example 1 | 253 |

As shown in Table 3, a volume increase amount of the secondary battery cells according to Examples 5 to 9 according to the present invention was in a range of 52 to 62, and a volume increase amount of the secondary battery cell according to Comparative Example 1 was 253. In other words, the secondary battery cell of Comparative Example 1 showed a high swelling phenomenon compared with the secondary battery cells of Examples 5 to 9. The reason is that carbon dioxide and carbon monoxide generated inside the battery cells of Examples 5 to 9 were removed by the gas-absorbing polymer, and accordingly, the battery cells were suppressed from having a volume expansion and a swelling phenomenon, but since the secondary battery cell of Comparative Example 1 included no gas-absorbing polymer and failed to remove gas such as carbon dioxide and the like, the battery cell was expanded by the same volume as that of actually generated gas. Accordingly, the secondary battery cell including a gas-absorbing polymer having an azo group was suppressed from ignition or explosion, and safety of the secondary battery cell was much increased.

It will be understood by those skilled in the art that various modifications and changes can be made in the scope of the present invention based on the above description.

As described above, a secondary battery cell according to the present invention includes a gas-absorbing polymer having an azo group to absorb a gas generated during normal or abnormal operation of the battery cell, and thus is prevented from swelling and thus suppressed from explosion or ignition due to an internal pressure increase of the battery cell, and resultantly, safety of the battery cell may be much improved.

In addition, the gas-absorbing polymer layer is used as an adhesive layer replacing a conventional laminate sheet or partly formed on a part of the laminate sheet, and accordingly, may prevent a thickness increase over the entire laminate sheet and thus a capacity decrease of the battery cell.

The invention claimed is:

1. A secondary battery comprising:
   a battery case, the battery case being a pouch-type case comprising a laminate sheet, the laminate sheet including an external coating layer, a barrier metal layer, and a heat-fusion resin layer, the heat-fusion resin layer being coated with a gas-absorbing polymer layer including a gas-absorbing polymer, the gas-absorbing polymer having an azo group; and
   an electrode assembly sealed within the battery case together with an electrolyte,
   wherein the gas-absorbing polymer is coated on all parts of internal surfaces of the laminate sheet contacting the electrolyte, excluding a sealing part of the battery case.

2. The secondary battery of claim 1, wherein the gas-absorbing polymer layer includes a gas-absorbing polymer and a matrix binder.

3. The secondary battery of claim 2, wherein the matrix binder is composed of at least one selected from epoxy-based, phenol-based, melamine-based, polyester-based, urethane-based, polyethylene terephthalate-based, and polyether urethane-based resins.

4. The secondary battery of claim 1, wherein a coating thickness of the gas-absorbing polymer layer is within a range of 0.1 μm to 100 μm.

5. The secondary battery of claim 1, wherein the gas-absorbing polymer selectively absorbs carbon dioxide and carbon monoxide.

6. The secondary battery of claim 5, wherein an absorption amount of the carbon dioxide and carbon monoxide is 10% to 30% of the weight of the gas-absorbing polymer.

7. A battery pack comprising the secondary battery of claim 1.

8. A device comprising the battery pack of claim 7 as a power source.

9. A secondary battery comprising:
   a battery case, the battery case being a pouch-type case comprising a laminate sheet, the laminate sheet including an external coating layer, a barrier metal layer, and a heat-fusion resin layer, the heat-fusion resin layer having through-openings extending therethrough, the through-openings being filled with portions of a gas-absorbing polymer layer, the gas-absorbing polymer having an azo group; and
   an electrode assembly sealed within the battery case together with an electrolyte.

10. The secondary battery of claim 9, wherein the portions of the gas-absorbing polymer extend out of the through-openings, such that a thickness of the portions of the gas-absorbing polymer layer is greater than a thickness of the heat-fusion resin layer.

* * * * *